UNITED STATES PATENT OFFICE.

FRANK P. ARNOLD, OF CARBONDALE, PENNSYLVANIA, AND GEORGE F. WEDEMAN, OF WASHINGTON, DISTRICT OF COLUMBIA.

PROCESS OF TREATING ORES.

1,104,287. Specification of Letters Patent. Patented July 21, 1914.

No Drawing. Application filed February 12, 1914. Serial No. 818,404.

*To all whom it may concern:*

Be it known that we, FRANK P. ARNOLD and GEORGE F. WEDEMAN, citizens of the United States, residing, respectively, at Carbondale, Lackawanna county, Pennsylvania, and Washington, District of Columbia, have invented certain new and useful Improvements in Processes of Treating Ores; and we do hereby declare the following to be a full, clear, and exact description of the invention, such as will enable others skilled in the art to which it appertains to make and use the same.

Our invention relates primarily to the metallurgical art, has especial reference to the preliminary treatment of ores for the recovery of precious metals, such as gold, silver, copper and the like, has for its object the elimination of sulfur, arsenic and other deleterious matter and rendering the ore subject to successful subsequent treatment by amalgamation, cyanidation or other means, for separating the values from the ore.

The invention consists in the process of treating ores which will be fully disclosed in the following specification and claims.

The prevailing practices of treating ores for desulfurizing, have included the presence of oxygen of the atmosphere to form a union of the bodies and the oxygen, which was succeeded by smelting in order to expel oxid of iron and other foreign substances. In these practices, it has been found that the volatile metals have escaped from the retort or furnace in which the ores have been treated, by passing off through the draft flues or the open charging end of the furnace stack and have been lost.

We have discovered that the crystalline structure common in pyrite ores when broken up, the metallic elements set free, and the sulfur, arsenic and other gases digested, driven off or expelled, when the ore is in a finely comminuted or pulverized condition, is acted upon directly by neutralizing agents, such as suitable chemicals and a dry gas applied in a highly heated condition.

It is our purpose to exclude atmospheric air from the retort, confine the major portion of the gases and commingle them with the heated ores in the retort, and conduct the excess of gases to a suitable receptacle, where they are condensed and the escape of values is prevented, by collecting them in the receptacle.

By our process, the ore properly comminuted is impregnated with suitable chemicals, preferably bicarbonate of soda, caustic potash (lye), and chlorid of sodium (common salt), in the following proportions. To each ton of ore to be treated, we add from one to three pounds of bicarbonate of soda, from one to three pounds of caustic potash and from one to three pounds of chlorid of sodium for the purpose of neutralizing the acids contained in the ore and also separating the metals in the ore. These proportions must be varied according to the percentage of sulfids and baser metals in the ore, as will be understood by the metallurgical chemist.

A hydrolytic monoxid gas may be generated by passing live steam through a proper receptacle, expanding the steam and drawing off the water of condensation resulting from expansion and cooling, then superheating the dry or anhydrous steam or gas. The gas thus generated is forced by its own pressure, or by any approved means into or through the finely comminuted chemically impregnated and heated ore which is agitated in the absence of the oxygen of atmospheric air to further neutralize or release the base metals and gases from the ore.

The waste gases in the retort emanating from the baser metals and other foreign matter in the ore and supplied by the gas are controlled by a suitable pressure regulating device and conducted from the retort to a suitable tank or other receptacle and condensed.

The ore is heated to temperatures above 700° Fah. and the steam, highly heated and converted into gas, is supplied to the retort at about fifteen pounds pressure and thoroughly commingled with the ore and the chemicals described, whereby the ore is digested in the presence of the major portion of the gases, and the excess of gases is arrested or collected and condensed.

The ore desulfurized and thoroughly relieved of all baser metals and minerals by the aforesaid treatment, when cooled, is in condition for separating the precious metals therein contained by amalgamation, cyanidation, or other approved means.

It is obvious that modifications in the process may be made by using other neutralizing agents with the ores in the retort without departing from the spirit of our invention, so long as the highly heated gas is used in conjunction therewith.

It is also our purpose to dissolve the alkaline and saline agents, introduce the solution in small quantities into the highly heated gas, vaporize the solutions and subsequently generate or convert it into a gas of which all of said ingredients form component parts, and then conduct the new gas into and commingle it with the ore for the purpose of desulfurizing the ore and relieving it of other deleterious foreign matter.

Practical demonstration of the invention has shown, that ores treated by the described process, are thoroughly relieved of sulfids, arsenic, and other deleterious matter without loss of the precious metals contained in the ores, and at a very low cost of operating expenses.

Having thus fully described our invention, what we claim is:

1. The process of treating ores which comprises expanding live steam, drawing off the water of condensation, superheating the dry steam and passing the gas thus formed through comminuted ore impregnated with neutralizing agents, substantially such as described.

2. The process of treating ores which comprises expanding live steam, drawing off the water of condensation, superheating the dry steam and passing the gas thus formed through comminuted ore impregnated with neutralizing agents, substantially such as described, and heating and agitating the ore.

3. The process of treating ores which comprises expanding live steam, drawing off the water of condensation, superheating the dry steam and passing the gas thus formed through comminuted ore impregnated with neutralizing agents, substantially such as described, heating and agitating the ore and arresting and condensing the excess of gases.

4. The process of treating ores which comprises expanding live steam, drawing off the water of condensation, superheating the dry steam and passing the gas thus formed through ore impregnated with a neutralizing agent composed of bicarbonate of soda, caustic potash and sodium chlorid.

5. The process of treating ores which comprises expanding live steam, drawing off the water of condensation, superheating the dry steam, and passing the gas thus formed through ore impregnated with a neutralizing agent composed of bicarbonate of soda, caustic potash, and sodium chlorid, heating and agitating the ore and collecting and condensing the excess of gases.

6. The process of treating ores comprising, impregnating the ore with a suitable alkaline agent, heating and agitating the ore, supplying highly heated anhydrous steam to the ore, and digesting the ore in the presence of the major portion of the gases.

7. The process of treating ores comprising impregnating comminuted ores with suitable alkaline and saline agents, heating and agitating the ores and supplying highly heated anhydrous steam thereto.

8. The process of treating ores which comprises, heating and agitating finely comminuted ores, and subjecting the ores to superheated anhydrous steam, alkaline and saline agents, and arresting and condensing the excess of gases.

In testimony whereof we affix our signatures, in presence of two witnesses.

FRANK P. ARNOLD.
GEORGE F. WEDEMAN

Witnesses:
D. C. REINOHL,
W. PARKER REINOHL.